United States Patent [19]

Berruyer et al.

[11] Patent Number: 4,758,823
[45] Date of Patent: Jul. 19, 1988

[54] SYSTEM FOR PROTECTING A GROUP OF LOCATIONS OF A NETWORK BY ANTICIPATING VANDALISM

[76] Inventors: Yves Berruyer, 94 Bld Gabriel Péri, 92240 Malakoff; Gérard Chamenat, 9, rue des Fauvettes, 92320 Chatillon sous Bagneux; Jean-Pierre Mounier, 2 rue des Favorites, 75015 Paris, all of France

[21] Appl. No.: 5,897

[22] Filed: Jan. 22, 1987

[30] Foreign Application Priority Data

Jan. 22, 1986 [FR] France .................. 86 00865

[51] Int. Cl.⁴ ............................. G08B 25/00
[52] U.S. Cl. ............................. 340/524; 340/525; 340/526; 340/506; 340/511
[58] Field of Search ............... 340/524, 525, 506, 508, 340/526, 510, 511; 364/550, 551

[56] References Cited

U.S. PATENT DOCUMENTS

| | | | |
|---|---|---|---|
| 3,855,456 | 12/1974 | Summers et al. | 340/524 |
| 4,124,848 | 11/1978 | Clark et al. | 340/524 |
| 4,208,552 | 6/1980 | Castriotta et al. | 340/524 |
| 4,581,605 | 4/1986 | Vogt | 340/525 |

FOREIGN PATENT DOCUMENTS

2395557 1/1979 France .
2499737 8/1982 France .

Primary Examiner—Donnie L. Crosland
Attorney, Agent, or Firm—Oblon, Fisher, Spivak, McClelland & Maier

[57] ABSTRACT

System for protecting a group of location of a network by anticipating an act of vandalism. A monitoring apparatus connected to detection apparatus on the location in order to establish in real time a modification of the state of a location as a result of an act of vadalism, a storage apparatus for storing the fixed characteristics of each location, a processing apparatus and a display for displaying the result supplied by the processing apparatus. This processing apparatus is able to communicate with the monitoring apparatus so that it can be informed in real time of an act of vandalism affecting a location, store the characteristics of the vandalized locations, determine the trajectories of the vandals, extrapolate said trajectories to forecast a location liable to be vandalized and inform an operator by supplying using the display means information in such a way as to protect a location liable to be vandalized by anticipating the trajectory of a vandal.

7 Claims, 5 Drawing Sheets

SYSTEM FOR PROTECTING A GROUP OF LOCATIONS OF A NETWORK BY ANTICIPATING VANDALISM

BACKGROUND OF THE INVENTION

The present invention relates to a system for protecting a group of locations of a network essentially consisting of forecasting a future act of vandalism at a location and intervening there prior to the vandalism occurring. The invention more particularly applies to the protection of networks, whose locations are accessible to the public, e.g. public telephone boxes or booths or automatic banknote dispensers.

The maintenance of such locations is a considerable burden on the network operator, because such locations are frequently damaged, either by pure vandalism, or, e.g. in the case of coin-operated public phone booths or pay-phones booths, with the aim of obtaining the money therein. Moreover, in the case of toll systems where the user pays for the use of a location, damage to such a location leads to a loss of income for the network operator.

The network operator generally wishes to rapidly restor a location which has been damamged to the operating state. Thus, it has been found that if a damaged location is left for several days, it can lead to the damaging or vandalism of other locations. Conversely, where damaged locations are rapidly restored to the operating state, a better service can be provided to users and it also contributes to giving the network operator a good image. Finally, it is obvious that rapid repair of damaged locations is of particular importance in the case of toll networks.

Numerous systems for monitoring the locations of a network have already been proposed, particularly in the case of public phone booths. For example, an apparatus analysing public telephone traffic is described in French Pat. No. 2 420 258. This apparatus comprises means for storing a lower limit and an upper limit of the traffic intensity of a telephone booth, said limit being fixed on the basis of observations of the traffic of said booth over a predetermined period, as well as means for comparing the real traffic intensity of the booth with the stored traffic limits. This apparatus in particular makes it possible to establish whether a telephone booth is faulty, because then its traffic is zero.

Public phone booth monitoring systems are also known, which comprise providing a certain number of sensors on the main phone booth members, such as the coin receiving means, the hand set and the actual booth, as well as alarm means making it possible to transmit an alarm on the line when the signal supplied by the sensor changes state. Such systems are more particularly described in French Pat. Nos. 2 395 557 and 2 499 737.

The known monitoring systems permit a passive monitoring of the network locations. They inform the network operator maintenance service that a booth has been damaged, which permits a rapid intervention for the purpose of repairing said booth. Although such monitoring systems are effective for maintaining the network locations in an operating state, they suffer from the disadvantage of not preventing or at least limiting damage to the network locations. Thus, very considerable costs are involved in restoring to an operating condition damaged or vandalized locations.

The object of the invention is to limit damage to the locations of a network accessible to the public. The invention is based on the finding that the attacked locations are not chosen completely at random and that instead the trajectory, path or route followed by a vandal successively attacking several locations can be at least partly dictated by criterion such as the nature of the location, e.g. public pay-phone booths, or the topography of the network, e.g. locations located on the same city street.

This finding makes it possible to envisage the forecasting of the trajectory of a person attacking the locations of a network. This forecast consists of extrapolating the trajectory of the vandal on the basis of the sequence of vandalized locations, which is possible as soon as the trajectory is outlined, i.e. as soon as at least two sites have been vandalized.

In conjunction with the police anticipating the trajectory of a vandal makes it possible to arrest him. This constitutes a first protection provided by the invention. In the long term, a supplementary protection is provided by the dissuasion effect on potential vandals as soon as the effectiveness of the protection system according to the invention is known and its effectiveness has been recognised.

SUMMARY OF THE INVENTION

The present invention more specifically relates to a system for the protection of a group of locations of a network comprising, on each location, a means for detecting the state (operating or faulty) of the location, said system comprising a monitoring means connected to each of the detection means to establish in real time the modifications of state of the locations as a result of vandalism, said system comprising, a storage means for storing the configuration of the network and fixed characteristics of each location;

a processing means comprising a processor, a memory containing instructions and a working memory, said processor performing the instructions and being able to: communicate with the monitoring means so that it can be informed in real time of vandalism affecting a location, storing in the working memory at least one identification variable of said vandalized location, analysing the content of the working memory following each storage of a location therein, as soon as at least two vandalized locations have been indentified, in order to determine the number of vandals, said determination taking account of the data of the storage means, determining the trajectory of each vandal, storing in the working memory the characteristics of each trajectory and extrapolating each trajectory, whilst taking account of the data contained in the storage means and the data contained in the working memory, said extrapolation defining for each trajectory at least one location liable to be vandalized in the near future and supplying alarm signals to indicate at least certain of the said locations liable to be vandalized in the near future.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
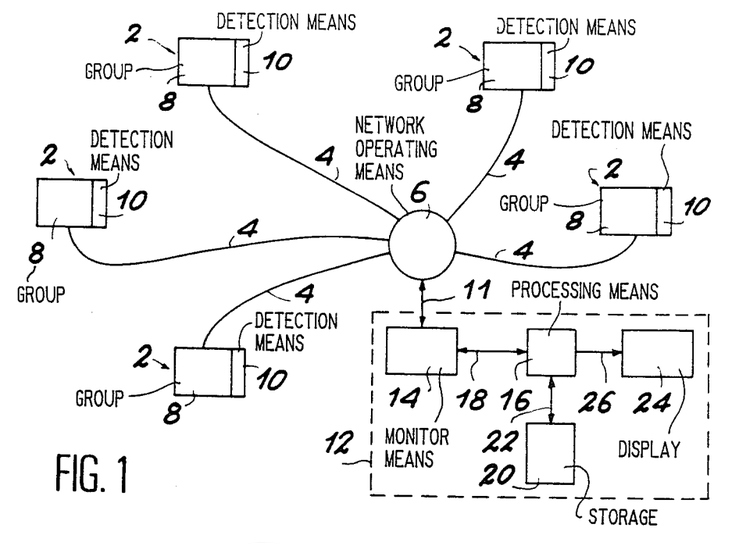
FIG. 1, a network of locations to which is connected a protection system according to the invention.

FIG. 1 shows a network of locations with which is connected a protection system according to the invention. The system comprises a plurality of locations 2, each connected by a channel 4 to a network operating means 6. Means 6 is e.g. an automatic switch in the case where the locations 2 are public phone booths, or a computer in the case where locations 2 are automatic bank note dispensers. Each location comprises a group 8 formed by a single apparatus (single phone booth) or several apparatuses (several phone booths) and at least one detection means 1 for controlling the state, i.e. operating or faulty, of each apparatus of the group 8. Detection means 10 are designed so as to transmit messages on channels 4 to the operating means 6 for indicating that an apparatus of a location is faulty.

Several public phone booth remote monitoring systems are known. In the DAHUT system, a detection means detecting a faulty apparatus transmits a predetermined frequency signal on line 4, said system being described in French Pat. No. 2 499 437. In the CACTUS system, the detection means comprises a microprocessor circuit able to communicate with a central alarm station accessible via the telephone network by dialling its telephone number.

The DAHUT and CACTUS systems make it possible to transmit alarms from public phone booths and the supply of alarm messages to the alarm station of the operating means. These systems have no alarm storage means.

The remote monitoring of public phone booths can also take place by using the ALPHA system, which has a means for storing all the faulty public phone booths at a given time. Thus, this system permanently provides details on the state of the network.

A description will now be given of the protection system according to the invention associated with the group or array of locations. This protection system 12 is connected to the network operating means 6 by a channel 11 so as to be able to receive from the latter information concerning the operating state of the different locations of said network. Therefore the protection system has a monitoring means 14 connected to the network operating means 6, as well as a processing means 16 having at least one processor and a memory containing the instructions which can be performed by the processor. Processing means 16 communicates with the monitoring means by a channel 18 and is consequently informed in real time of vandalism affecting a random location in the network.

The protection system according to the invention also comprises a storage means 20 connected to the processing means 16 by a channel 22 for the purpose of storing data defining the network, i.e. in particular the position of each location, the number and nature of each apparatus in each location, etc. Finally, the protection system 12 comprises a display means 24, which receives by means of a channel 26 data from the processing means 16. This display means can be a printing terminal, a display terminal and in general terms any known systems usable for communicating to an operator the result of operations performed by the processing means 16.

Figure 2:
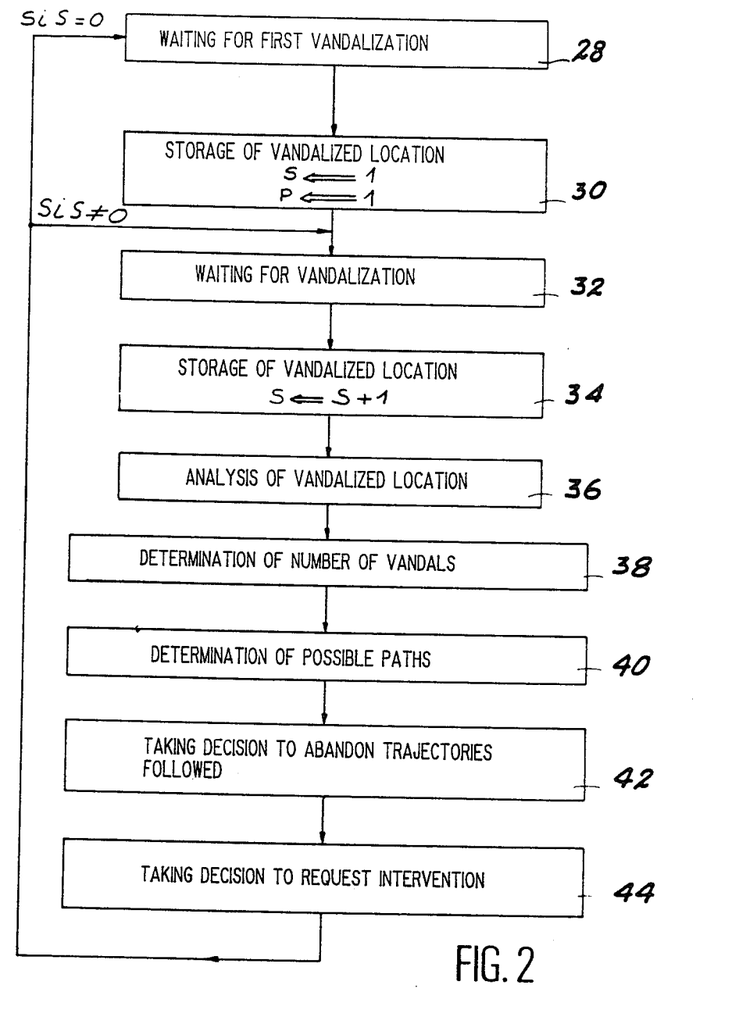
FIG. 2, a flowchart of the operation of the processing means according to the invention.

FIG. 2 is a flowchart illustrating the operation of the protection system according to the invention. In a first stage 28, the system is in a standby condition awaiting a first vandalization of a location. For the protection system processing means 16, this stage consists of communicating with the monitoring means 14 so that it can be informed of vandalization of a location within the network. When such a vandalization is detected, processing continues by a stage 30 of initializing the number s of vandalized locations and the number p of vandals each at the value 1. The system is then again placed on standby awaiting further vandalization, said stage 32 being identical to stage 28.

When further vandalization is recorded at least one identification variable of the vandalized site is stored in the working memory of processing means 16 and variable s is incremented (stage 34).

Following said stage, the working memory of the protection system contains at least two vandalized locations. It is therefore possible to study the trajectory of the vandal or the trajectories of the vandals. The processing carried out on said data contained in the working memory involves two successive stages, namely a stage of analysing the trajectory of each vandal to determine the characteristics of each trajectory if they exist. The second stage is the extrapolation of the trajectories to anticipate the movement of the vandals and thus protect the locations liable to vandalized.

The analysis and anticipation operations performed by the processing means take account of the characteristics of each location and the characteristics of each given trajectory. The characteristics associated with a location can vary as a function of the type of network studied. For example, for the network of public phone booths, each location can be defined by the characteristics or attributes indicated in the following table I.

TABLE I

| ATTRIBUTES | SYMBOL | PARAMETER |
|---|---|---|
| A1 | AD | Address or space coordinates of the location |
| A2 | TA | Access time to the location from the address |
| A3 | NSE | Number of elementary locations |
| A4 | ME | Status word |
| A5 | DP | Location vandalization data |
| A6 | PP | Probability of vandalism |
| A7 | PA | Probability of belonging to a trajectory |

The values of attributes A1, A2 and A3 are constants and can consequently be stored in the storage means of the protection system. The access time TA is not zero if the location is at a relatively protected point and the number NSE of elementary locations indicates the number of telephones at the location. This number can differ from 1, e.g. in the case of a location having a multi-telephone booth or a row of telephones on a wall (e.g. in a station or airport).

Conversely, the values of the attributed A3 to A7 are a function of the vandalization acts affecting the network. Thus, these attributes are stored in the working memory of the processing means.

The status word (attribute A4) can e.g. assume four values: active location, vandalized location, location with plausible vandalization and location chosen for intervention.

Figure 3:
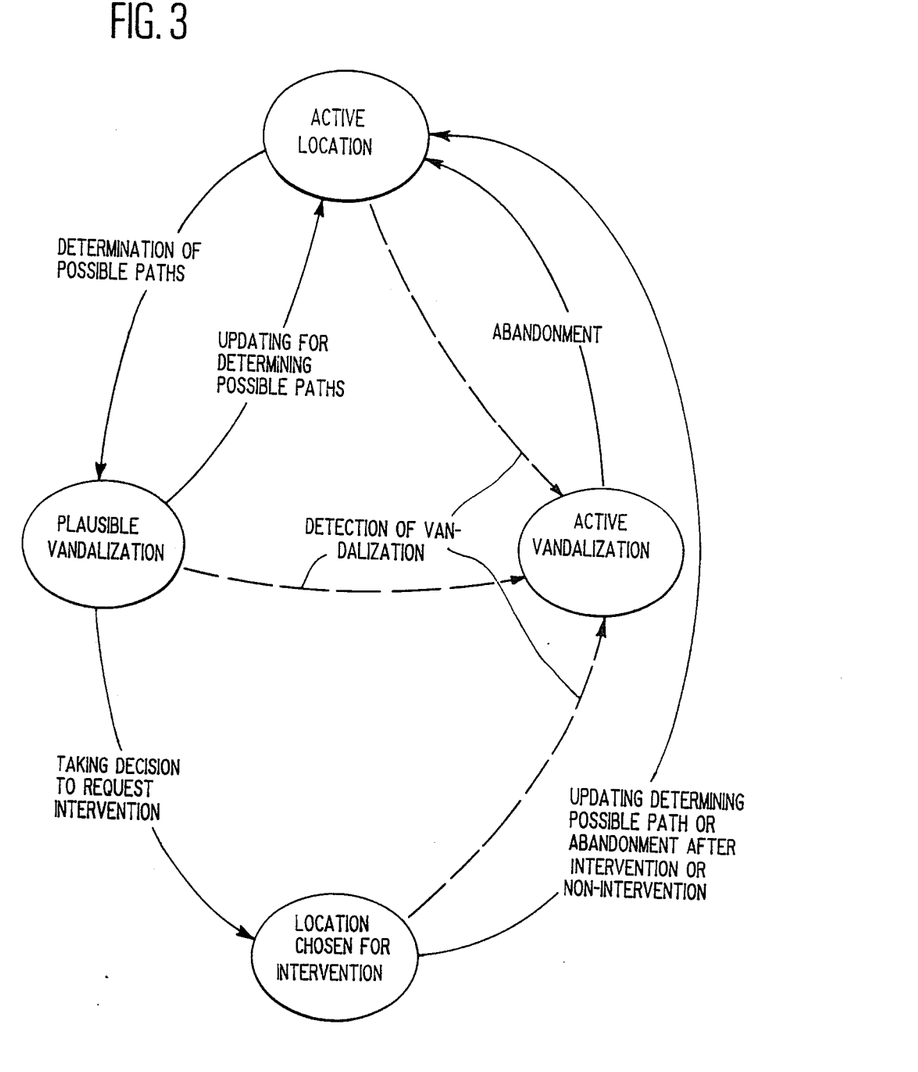
FIG. 3, the diagram of the states of a location.

The diagram of the states of a location is shown in FIG. 3. This shows the four states and the possible transitions from one state to the other. These transitions are due either to an event, such as the detection of vandalism (operation 28 or 32 in FIG. 2), or to a decision resulting from processing, such as operation 40 of determining the possible paths, or operation 42 of taking the decision to abandon a followed trajectory, or operation 44 of taking a decision for requesting intervention. (operations 40, 42 and 44 will be described hereinafter).

The vandalization data DP (attribute A5) is the effective data if the location is vandalized and plausible vandalization data if the location is liable to be vandalized. The vandalization probability value (attribute A6) is only significant if the status word has as its value "plausible vandalization".

Each location can consist of several elementary locations (NSE≠1). For each elementary location is defined a vandalization duration TP, which is a theoretical time taken by a vandal on the elementary site and is fixed on the basis of experience.

Like the locations, the trajectories are defined by several characteristics or attributes. For example, in the case of public phone booth networks, the attributes associated with a trajectory can be as given in the following table II.

TABLE II

| ATTRIBUTES | SYMBOL | PARAMETER |
|---|---|---|
| B1 | NT | Nature of trajectory |
| B2 | VP | Speed of vandal |
| B3 | TIM | Average intervention time per elementary site |
| B4 | CP | Vandal advance criterion |
| B5 | NP | Nature of vandalism |
| B6 | ME | Status word |

The trajectory can be of different natures (attributes B1). It can be pseudo-random or linked with the topography of the environment. The attribute B3 defines the average time taken by a vandal on an elementary site. At the start of creating a trajectory, parameter TIM is initialized at value TP. Attribute B5 gives information on the nature of the vandalism, i.e. as to whether they affect pay-phone booths, card-operated booths or all booth types.

Figure 4:
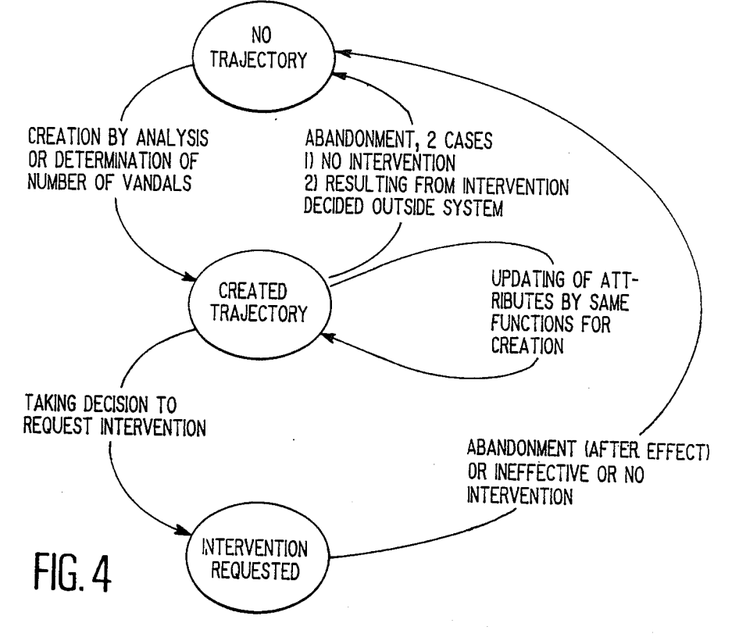
FIG. 4, the diagram of the states of a trajectory.

The status word (attribute B6) can assume three values for indicating an absence of trajectory, a created trajectory and an intervention requested on a trajectory. The diagram of the states of a trajectory is shown in FIG. 4. The transitions between these different states results either from an updating of a trajectory by adding the last vandalized location, or a decision to request intervention, or the abandoning of a trajectory.

We will now return to the flowchart of FIG. 2. Operation 36 of analysing the locations consists of updating the value of the attributes of the locations and the trajectory stored in the working zone of the processing means.

The following operation (stage 38) is the determination of the number of vandals, i.e. the number of trajectories. For this purpose, for each trajectory $i(1 < i < P)$ contained in the working memory is calculated the speed Vi of movement of the vandal between the most recent vandalized location of trajectory i and the last vandalized location and said speed Vi is compared with the mean speed $VP_i$ (attribute B2) of the vandal on trajectory i. If the relative difference between these speeds is below a predetermined threshold, i.e. if $VP_i(1-b) < V_i < VP_i(1+h)$, in which b and h are positive constants, the last vandalized location is added to path i.

For example, it is possible to define the probability of a vandalized location belonging to a trajectory (attribute A7 of a location) in the following way. First of all a probability rate or ratio is defined $$t_i = 1 - \frac{|V_i \ VP_i|}{VP_i}$$

for the cases where the location can belong to the trajectory i, together with a probability of belonging to said trajectory $$PA_i = \frac{t_i}{\sum_j t_j}$$

in which the sum on the index j relates to all the plausibility associated with the trajectories of index j able to contain the last vandalized location. If the group of trajectories is empty, a new trajectory is created and only contains the last vandalized location.

Stages 36 and 38 effect an update of the values of the characteristics of the locations and the trajectories contained in the working memory, as a function of the last location vandalized.

The possible extensions for each trajectory is determined in a stage 40 on the basis of said data. These extensions are essentially made whilst taking account of the nature of the trajectory (attribute B1) and the nature of the acts of vandalism B5.

The extension of a trajectory can lead to possible multiple paths, certain of which may join. The locations located on these paths pass from the active state to the plausible vandalization state (cf FIG. 3). For these locations, the presumed vandalization data (attribute A5) and the probability of said vandalization (attribute A6) are calculated.

If a location in the plausible vandalization state belongs to several possible paths, its presumed vandalization data is the smallest, i.e. the closest in time of the presumed vandalization data resulting from the different paths and its vandalization probability is the sum of vandalization probabilities given by each possible path.

The vandalization probabilities of the locations liable to be vandalized are calculated step by step for the locations of the same path. More specifically, if $P_k$ is the vandalization probability of a location on a path, the vandalization probability $P_j$ of a location j following location k on a path is equal to:

$$P_j = \rho_k \cdot \frac{pr_j}{\Sigma Pr_m}$$

in which the sum is extended to all possible locations m from location k and $pr_j$ is a preference function taking account of the position of the location j with respect to location k (proximity, visibility, etc).

The number of analysed locations j or in other words the length of the possible paths extending the trajectories defined by the vandalized locations is chosen in such a way that the anticipation in time is at least equal to the intervention time Ti representing the time considered necessary to bring abut effective intervention.

The decision to abandon a trajectory (operation 42 in FIG. 2) can be taken after an intervention has taken place on one of the locations, on request or outside the protection system. It can also be taken when it is apparent that the trajectory is no longer compatible with the last vandalized locations. Finally, the abandoning of a trajectory can be automatic if the time between the data of the last recorded vandalization act and the present data exceeds a maximum predetermined time DL.

The decision to request intervention (operation 44 in FIG. 2) on a location liable to be vandalized is dependent both on the presumed time data of the act and the probability thereof. More precisely, the presumed time data for the act of vandalism must be after the present time increased by the predetermined time Ti defining the time necessary for effectively intervening. Moreover, the probability of vandalization must exceed a predetermined threshold SI.

It should be noted that if the trajectory of the vandal has only one possible extension, the probability of vandalization is equal to one. The decision to intervene is then only based on the presumed time data of vandalization.

With reference to FIG. 1 the protection system according to the invention is described and with reference to FIGS. 2 to 4 the operation of the processing means of said protective system. The different operations performed by said processing means have been described in general terms without referring to a particular network configuration. However, it is clear that certain operations performed by the processing means, such as the determination of possible paths are a function of the configuration of the studied network.

For a better understanding of the operation of the protection system according to the invention, a description will now be given of the operation of the protection system processing means in two particular network examples.

EXAMPLE 1

Figure 5:
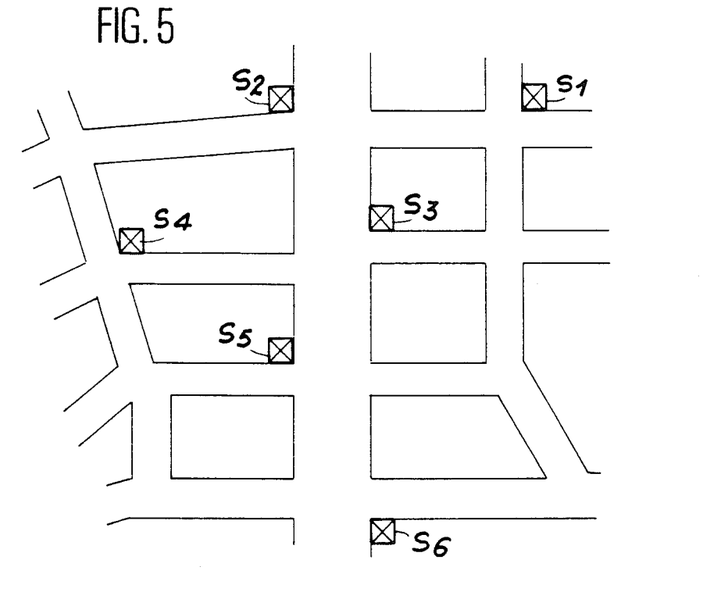
FIG. 5, diagrammatically an area of a city with several locations.

The network comprises public telephone booths installed in a city. FIG. 5 diagrammatically shows the map of an area of said city and the position of six locations $S_1$, $S_2$ ... $S_6$, each location having one or more public telephones. Locations $S_2$, $S_3$, $S_5$ and $S_6$ are located on a main highway and location $S_1$ and $S_4$ in adjacent streets. The following table II summarizes the values of attributes A3 to A6 of the locations in the absence of vandalism. Attribute A7 has been omitted for simplification reasons (a single trajectory). It is also assumed that the locations are easily accessible, i.e. the access time TA (attribute A2) is zero. Finally, attribute A1 contains either an address (number and name of street), or space coordinates of the location in the plan.

TABLE III

| Location | Number of elementary locations (NSE) | Status word (ME) | Vandalization data (DP) | Vandalization probability (PP) |
|---|---|---|---|---|
| $S_1$ | 1 | active | — | — |
| $S_2$ | 2 | " | — | — |
| $S_3$ | 2 | " | — | — |
| $S_4$ | 1 | " | — | — |
| $S_5$ | 2 | " | — | — |
| $S_6$ | 2 | " | — | — |

One of the essential parameters of the protection system according to the invention is the preference function PR, which has the function of determining in as correct a manner as possible, the probabilities of choice of a vandal. It must therefore take account of notions inherent to human behaviour.

It can advantageously take account of at least one of the following notions:
the traffic of the location, particularly in the case of pay-phone booths,
the distance between locations,
the visibility between individual locations and
the directivities; if the vandal intervenes on a major highway he has the tendency to follow it.

In the example described, the following preference function is chosen:

$$pr = \frac{\alpha + \beta \cdot \cos \theta}{a}$$

in which $\alpha + \beta \cdot \cos \theta$ is a directivity function and $1/d$ a proximity function 7; $\alpha$ and $\beta$ being predetermined coefficients and $\theta$ measures the deviation between the direction of the extended path connecting a considered location liable to be vandalized and the preceding location on the path or trajectory and the direction of the path or trajectory terminating on said preceding location, whilst d is the distance between the considered location and the preceding location on the path or trajectory.

For example, the following values are chosen for the different parameters of the protection system according to the invention: VS=50 km/h, b=0.7; h=2; TI=15 mn; TP=3 mn; DL=1 h; SI=60%; $\alpha$=0.6; $\beta$=0.4. For distances between locations, use is made of the following values d($S_1$, $S_3$)=500 m; d($S_2$, $S_3$)=350 m; d($S_3$, $S_4$)=550 m; d($S_3$, $S_5$)=350 m; d($S_4$, $S_5$)=450 m; d($S_5$, $S_6$)=450 m.

When no vandalization occurs, the protection system is on standby for the first act of vandalism. Assuming that at time data $t_0$=21 h 00 mn, an alarm is given at location $S_2$, then:

(a) the system initializes at value 1 the variables s and p indicating the number of vandalized locations and the number of vandals, location $S_2$ being stored in the working memory—its status word assuming the value "vandalized" and the vandalization time data DP the value 21 h 00 mn, (b) a first trajectory is created, its status word assuming the value "created", TIM being initialized at the value of TP, whilst the other trajectory attributes are empty.

The system then awaits a further act of vandalism. Assuming that it is detected at location $S_3$ at $t_1$=21 h 13 mn, then:

(a) the value of the variable S is incremented, location $S_3$ is stored in the working memory and its status word assumes the value "vandalized" and its vandalization time data DP the value 21 h 13 mn, (b) the speed of the vandal is $$VP = \frac{d(S_2 \cdot S_3)}{t_1 - t_0 - NSE_{(S2)} \cdot TIM} = 3 \text{ km/h}$$

(c) updating of the attributes of trajectory $T_1$:
B1: advance criterion: closest location
B2: VP=3 km/h,
B3: TIM=3 mn,
B4: -
B5: -

Figure 6:
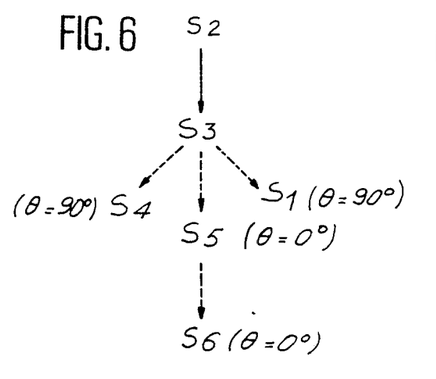
FIGS. 6 and 7, the possible paths for extending the trajectory of a vandal respectively after the second vandalization and after the third vandalization on the locations of FIG. 5.

(d) the number of vandals remains equal to 1 because VP<VS, (e) determination of the possible paths: They are obtained by extending the trajectory between locations $S_2$ and $S_3$, as shown in FIG. 6. The values of the angle $\theta$ are justified by the fact that locations $S_3$, $S_5$ and $S_6$ are on the same highway and that to reach locations $S_1$ and $S_4$ it is necessary to follow a street perpendicular to the main highway, (f) Probability of vandalization: locations $S_1$, $S_4$ and $S_5$ are directly accessible from location $S_3$. The calculation of the preference function pr for each of them gives $pr_1 = 12 \cdot 10^{-4}$, $pr_4 = 10.9 \cdot 10^{-4}$ and $pr_5 = 28.6 \cdot 10^{-4}$. From this is deduced the vandalization probability $PP_i$, in which i=1, 4, 5 by the relation $PP_i = pr_i/(pr_1 + pr_4 + pr_5)$ i.e. $PP_1 = 0.233$, $PP_4 = 0.212$ and $PP_5 = 0.555$. Since, in addition, location $S_5$ can be reached from location $S_4$ the vandalization probability of location $S_5$ is corrected by adding the vandalization probability of location $S_4$, i.e. $PP_5 = 0.555 + 0.212 = 0.767$. Finally, a single path connects location $S_6$ to the other locations, i.e. $PP_6 = PP_5 = 0.767$, (g) time data of plausible vandalization acts: it is calculated by the relation $$t_j = t_i + \frac{d_{ij}}{VP} + NSE_j \cdot TIM$$

in which j relates to the considered location and i to its antecedent on the path. We obtain $t_{21} = 21$ h 29 mn for location $S_1$, $t_{24} = 21$ h 30 mn for location $S_4$, $t_{25} = 21$ h 26 mn for location $S_5$ and $t_{26} = 21$ h 41 mn for location $S_6$. For location $S_5$ a calculation takes place of the vandalization data by path $S_3 \rightarrow S_5$ and by path $S_3 \rightarrow S_4 \rightarrow S_5$ and the closest data is retained, (h) taking decision to abandon trajectory: the problem does not arise: there is only one trajectory and the time which has elapsed between the vandalization act at locations $S_2$ and $S_3$ is below the limit time DL fixed at 1 h, (i) taking decision to request intervention: it is simultaneously necessary for the plausible vandalization data to exceed the present data $t_1$ increased by the intervention time TI and that the vandalization probability exceeds threshold SI. These conditions are only satisfied for location $S_6$.

Table IV summarizes the value of the parameters ME, DP and PP of the locations following processing.

TABLE IV

| Location | State ME | Vandalization time data DP | Vandalization probability PP |
|---|---|---|---|
| $S_1$ | P.P. (1) | 21h29 | 0.233 |
| $S_2$ | vandalized | 21h00 | 1 |
| $S_3$ | vandalized | 21h13 | 1 |
| $S_4$ | P.P. (1) | 21h30 | 0.212 |
| $S_5$ | P.P. (1) | 21h26 | 0.767 |
| $S_6$ | S.C.P.I. (2) | 21h41 | 0.767 |

(1) = plausible vandalization
(2) = location chosen for intervention.

The protection system informs the network operator of the location chosen for the intervention and is placed on standby for a further act of vandalism up to the limit time data $t_1 + DL$, i.e. 22 h 13 mn.

Figure 7:
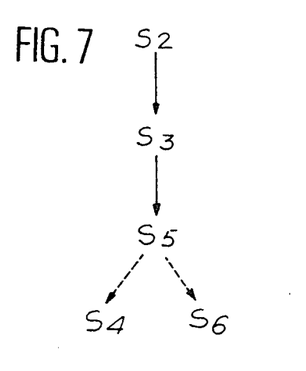

We will now assume that an act of vandalism affects location $S_5$ at $t_2 = 21$ h 32 mn, then:

(a) the variable S is incremented, the status word of the location $S_5$ assumes the value "vandalized" and its vandalization data is equal to 21 h 32 mn, (b) the speed of the vandal between locations $S_3$ and $S_5$ is $v = d(S_3, S_5)/(t_2 - t_1 - NSE \cdot TIM) = 1.6$ km/h. Thus, the relation $VP(1-b) < V < VP(1+h)$ is satisfied, (c) the average speed VP of the vandal on the trajectory is updated, calculation giving VP equals 2.4 km/h. The other attributes of the trajectory are unchanged, (d) the number of vandals is still 1 because VP<VS, (e) determination of the possible paths: they are shown in FIG. 7. Only locations $S_4$ and $S_6$ are liable to be vandalized bearing in mind the advance criterion (attribute B1 of the trajectory; the criterion being "closest location"), (f) probability of vandalism: The preference functions for locations $S_4$ and $S_6$ are respectively equal to $pr_4 = 0.6/450$ and $pr_6 = 1/450$, which gives the vandalism probabilities $PP_4 = 0.375$ and $PP_6 = 0.625$, (g) plausible vandalization data: the vandalization data on location $S_6$ is updated:

$$t_6 = t_2 + \frac{d(S_5 \cdot S_6)}{VP} + NSE \cdot TIM = 21 \text{ h } 50 \text{ mn},$$

(h) abandoning the trajectory does not arise, (i) $PP_6$ still exceeds SI, so that the request for intervention on location $S_6$ is not questioned. The network operator is informed of the latest plausible vandalization time data on location $S_6$.

EXAMPLE 2

This relates to part of a network formed from locations in a station at three levels. This station is diagrammatically shown in FIG. 8, where the position of each location is defined. A location consists of several telephone booths, as indicated in table V.

TABLE V

| Location | NSE |
|---|---|
| $S_1$ | 1 |
| $S_2$ | 2 |
| $S_3$ | 2 |
| $S_4$ | 3 |
| $S_5$ | 2 |

The station constitutes a particularly complex location, particularly with regards to the relationships between the locations which cannot be merely described by the distances between them.

For example, the following parameters are used for the system:

the advance criterion (attribute B1) is the distance between the locations the vandalization time on each elementary location is $TP = 3$ mn, the movement time between two locations on the same level is 1 mn, the movement time between two locations in two consecutive levels is 2 mn, the intervention time is $TI = 10$ mn, the preference function is $pr = NSE$.

It will be assumed that a first act of vandalism affects location $S_1$ at $T_1$ taken as the time origin (i.e. $t_1 = 0$) and that a second act of vandalism is detected at location $S_2$ at $t_2 = 4$ mn.

Figure 9:
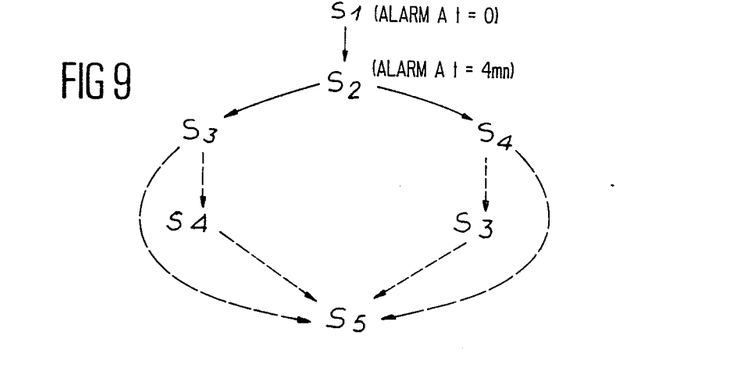
FIG. 9, possible paths for extending the trajectory of a vandal following the second vandalization on a location in FIG. 8.

The characteristics of the vandalized locations are stored in the same way as in example 1. Thus, a first trajectory containing locations $S_1$ and $S_2$ is created. The possible paths extending this trajectory are indicated in broken line form in FIG. 9. There can be four possible paths from $S_2$, i.e. $S_2 \rightarrow S_3 \rightarrow S_5$; $S_2 \rightarrow S_3 \rightarrow S_4 \rightarrow S_5$; $S_2 \rightarrow S_4 \rightarrow S_3 \rightarrow S_5$ and $S_2 \rightarrow S_4 \rightarrow S_5$.

The vandalism probability PP for each location following said path is calculated on the basis of the preference function, as in example 1. The vandalization time data DP is also calculated. The following values are obtained:

for location $S_3$ from location $S_2$: $PP = 0.4$ and $DP = 12$ mn, for location $S_4$ from location $S_2$: $PP = 0.6$ and $DP = 12$ mn, for location $S_4$ from location $S_3$: $PP = 0.24$ and $DP = 19$ mn, for location $S_3$ from location $S_4$: $PP = 0.3$ and $DP = 22$ mn, for location $S_5$: $DP = 20$ mn (value for the fastest path).

Taking account of the intervention time TI equal to 10 mn and the data for the second vandalization act occurring at $t_2 = 4$ mn, for an intervention request it is necessary to choose a location whose presumed vandalization data is in excess of 14 mn.

Figure 8:
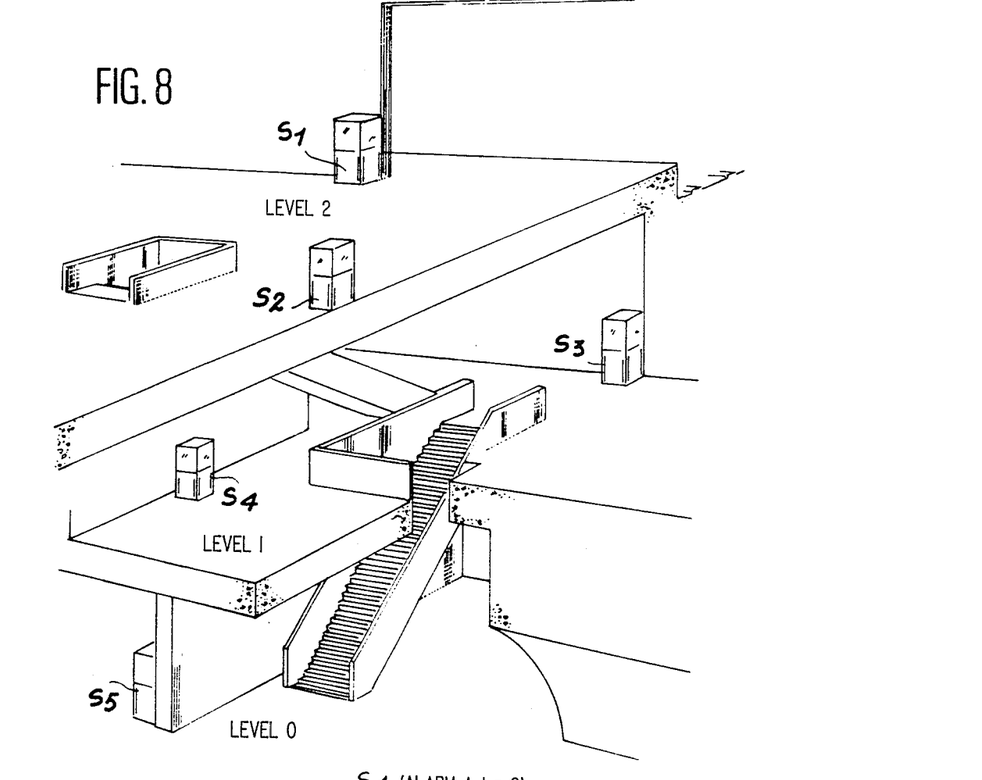
FIG. 8, diagrammatically several levels of a station and the distributions of the locations within said station.

FIG. 8 shows that locations $S_3$ and $S_4$ are suitable. The intervention team must either record the offence, or wait, or move between the individual locations of level 1, as a function of what takes place at $t = 12$ mn.

What is claimed is:

1. A system for the protection of a group of locations of a network comprising, on each location, a means for detecting the state (operating or faulty) of the location, said system comprising a monitoring means connected to each of the detection means to establish in real time the modifications of state of the locations as a result of vandalism, said system comprising a storage means for storing the configuration of the network and fixed characteristics of each location;

a processing means comprising a processor, a memory containing instructions and a working memory, said processor performing the instructions and being able to:

communicate with the monitoring means so that it can be informed in real time of vandalism affecting a location, storing in the working memory at least one identification variable of said vandalized location, analysing the content of the working memory following each storage of a location therein, as soon as at least two vandalized locations have been identified, in order to determine the number of vandals, said determination taking account of the data of the storage means, determining the trajectory of each vandal, storing in the working memory the characteristics of each trajectory and extrapolating each trajectory, whilst taking account of the data contained in the storage means and the data contained in the working memory, said extrapolation defining for each trajectory at least one location liable to be vandalized in the near future and supplying alarm signals to indicate at least certain of the said locations liable to be vandalized in the near future.

2. A system according to claim 1, wherein, with each location, is associated at least one of the following characteristics:

location address, access time to the location from the address, number of elementary locations forming the location.

3. A system according to claim 2, wherein, with each location, is associated in the working memory at least one of the following characteristics:

status word, time data of an effective or plausible act of vandalism on the location, probability of an act of vandalism on the location, probability of the location belonging to a trajectory.

4. A system according to claim 3, wherein each location comprises a status word, the latter being able to assume the three following values:

"active", if the location is operating,

"plausible vandalization", if the location is operating, but the extrapolation of the trajectories defines at least one path containing said location, "vandalized", if the location is faulty.

5. A system according to claim 4, wherein the processor is able to designate among the locations whose state is "plausible vandalization" a location where a vandal is liable to be apprehended by an intervention team, the status word of said location assuming a fourth value equal to "location chosen for intervention".

6. A system according to claim 5, wherein the location chosen for the intervention is such that it vandalization probability exceeds a threshold and its plausible vandalization data exceeds the present time data increased by a predetermined time equal to the time necessary for the intervention team to intervene.

7. A system according to claim 6, wherein the vandalization probability of a location is calculated by the processing means on the basis of a preference function, which takes into account at least one of the following parameters:

nature of the location, distance between locations, directivity and number of elementary locations of the location.

* * * * *